US007778206B2

(12) United States Patent
Shaffer et al.

(10) Patent No.: US 7,778,206 B2
(45) Date of Patent: *Aug. 17, 2010

(54) METHOD AND SYSTEM FOR PROVIDING A CONFERENCE SERVICE USING SPEAKER SELECTION

(75) Inventors: Shmuel Shaffer, Palo Alto, CA (US); Cullen F. Jennings, San Jose, CA (US); Labhesh Patel, Mountain View, CA (US)

(73) Assignee: Cisco Technology, Inc., San Jose, CA (US)

( * ) Notice: Subject to any disclaimer, the term of this patent is extended or adjusted under 35 U.S.C. 154(b) by 1625 days.

This patent is subject to a terminal disclaimer.

(21) Appl. No.: 11/030,832

(22) Filed: Jan. 6, 2005

(65) Prior Publication Data

US 2006/0146735 A1    Jul. 6, 2006

(51) Int. Cl.
*H04L 12/16* (2006.01)
(52) U.S. Cl. ............... 370/260; 370/468; 379/202.01; 455/416; 709/204
(58) Field of Classification Search ........... 370/260, 370/267, 468; 375/299; 379/202.01; 455/416; 709/204
See application file for complete search history.

(56) References Cited

U.S. PATENT DOCUMENTS

| 6,522,739 | B1 | 2/2003 | Kwon et al. ............ 379/202.01 |
| 6,611,503 | B1 * | 8/2003 | Fitzgerald et al. ............ 370/260 |
| 6,628,767 | B1 | 9/2003 | Wellner et al. ......... 379/202.01 |
| 6,650,745 | B1 | 11/2003 | Bauer et al. ............. 379/202.01 |
| 6,747,685 | B2 | 6/2004 | Taib et al. ................ 348/14.02 |
| 6,785,246 | B2 | 8/2004 | Foti ........................... 370/261 |
| 6,798,753 | B1 * | 9/2004 | Doganata et al. ........... 370/260 |
| 6,859,503 | B2 * | 2/2005 | Pautler et al. ............... 375/299 |
| 6,956,828 | B2 * | 10/2005 | Simard et al. ............... 370/260 |
| 6,996,073 | B2 * | 2/2006 | West et al. .................. 370/260 |
| 7,184,415 | B2 * | 2/2007 | Chaney et al. .............. 370/260 |
| 7,242,755 | B2 * | 7/2007 | Cope et al. ............. 379/202.01 |
| 7,266,091 | B2 * | 9/2007 | Singh et al. ................ 370/260 |
| 7,266,189 | B1 * | 9/2007 | Day ..................... 379/202.01 |
| 7,274,675 | B2 * | 9/2007 | Iveland et al. ............... 370/260 |
| 7,319,745 | B1 * | 1/2008 | Firestone ............... 379/202.01 |

(Continued)

OTHER PUBLICATIONS

Paxton J. Smith, et al., "*Tandem-Free VoIP Conferencing: A Bridge to Next-Generation Networks*", Topics in Internet Technology, IEEE Communications Magazine, pp. 136-145, May 2003.

(Continued)

*Primary Examiner*—Gerald Gauthier
(74) *Attorney, Agent, or Firm*—Baker Botts L.L.P.

(57) ABSTRACT

A method for providing a conference service using speaker selection includes hosting a conference between a plurality of endpoints and receiving from the plurality of endpoints a plurality of media streams. The plurality of media streams each include a power indicator. The method includes normalizing the power indicators to determine a normalized power indicator for each of the plurality of media streams and selecting, based on the normalized power indicators of the plurality of media streams, a first number of the plurality of media streams for processing into a conference stream. The method also includes processing the selected first number of the plurality of media streams into the conference stream and communicating the conference stream to at least some of the plurality of endpoints.

23 Claims, 2 Drawing Sheets

U.S. PATENT DOCUMENTS

| | | | |
|---|---|---|---|
| 7,460,493 B1 * | 12/2008 | Dhanoa et al. | 370/260 |
| 7,460,861 B2 * | 12/2008 | Zabawskyj | 455/416 |
| 7,466,812 B1 * | 12/2008 | Mahy et al. | 379/202.01 |
| 7,483,400 B2 * | 1/2009 | Kuusinen et al. | 370/267 |
| 7,492,729 B2 * | 2/2009 | Shaffer et al. | 370/260 |
| 2005/0114433 A1 * | 5/2005 | Rabipour et al. | 709/201 |

OTHER PUBLICATIONS

H. Schulzrinne, et al., "*RTP: A Transport Protocol for Real-Time Applications*", Network Working Group, Request for Comments: 3550, Category: Standards Track, pp. 1-98, Jul. 2003.

* cited by examiner

METHOD AND SYSTEM FOR PROVIDING A CONFERENCE SERVICE USING SPEAKER SELECTION

TECHNICAL FIELD OF THE INVENTION

The present invention relates generally to communication systems and, more particularly, to a method and system for providing a conference service using speaker selection.

BACKGROUND OF THE INVENTION

Historically, telecommunications have involved the transmission of voice and fax signals over a network dedicated to telecommunications, such as the Public Switch Telephone Network (PSTN). Similarly, data communications between computers have been historically transmitted on a dedicated data network, such a Local Area Network (LAN) or a Wide Area Network (WAN). Currently telecommunications and data transmissions are being merged into a integrated communication network using technology such as Voice over Internet Protocol (VoIP). Since many LANs and WANs transmit computer data using Internet protocol, VoIP uses this existing technology to transmit voice and fax signals by converting these signals into digital data and encapsulating the data for transmission over an IP network.

Traditional communication networks often support multi-point conferences between a number of participants using different communication devices. A multipoint conference unit (MCU) is used to couple these devices, which allows users from distributed geographic locations to participate in the conference. The conference may be audio only (e.g. teleconference) or may include video conferencing/broadcasting. In typical VoIP and time division multiplexing (TDM) multipoint conference systems, communications from the participants are bridged together for transmission to each of the other participants in the conference.

Most VoIP and TDM conference systems mix, for example, the top three speakers and ignore input from all other conference participants. In some cases all of the media streams arrive at the conference bridge in raw G.711 protocol encoded packets. However, in some cases the media streams are encoded with non-linear compression algorithms such that the power of the encoded packets is not proportional to the raw G.711 power of the signal. In other cases, the media streams which arrive at the mixer are encoded with different compression algorithms, for example, G.723 protocol or G.728 protocol. In either of these cases in order to compare the power in the various inputs, the media needs to be converted back to raw G.711 protocol.

In a large conference with many participants, the system has to employ many digital signal processing (DSP) resources to decode the media streams. For example, if a conference has 100 participants, all 100 media streams may need to be decoded in the process of selecting only 3 media streams, and the other 97 media streams will be discarded.

SUMMARY OF THE INVENTION

The present invention provides a method and system for providing a conference service using speaker selection that substantially eliminates or reduces at least some of the disadvantages and problems associated with previous methods and systems.

In accordance with a particular embodiment, a method for providing a conference service using speaker selection includes hosting a conference between a plurality of endpoints and receiving from the plurality of endpoints a plurality of media streams. The plurality of media streams each include a power indicator. The method includes normalizing the power indicators to determine a normalized power indicator for each of the plurality of media streams and selecting, based on the normalized power indicators of the plurality of media streams, a first number of the plurality of media streams for processing into a conference stream. The method also includes processing the selected first number of the plurality of media streams into the conference stream and communicating the conference stream to at least some of the plurality of endpoints.

Processing the selected first number of the plurality of media streams into the conference stream may comprise decoding the first number of the plurality of media streams, mixing the decoded first number of the plurality of media streams into a mixed stream, and coding the mixed stream to form the conference stream. Coding the mixed stream to form the conference stream may comprise converting the mixed stream to a G.711 protocol.

Normalizing the power indicators to determine a normalized power indicator for each of the plurality of media streams may comprise, for each of the plurality of media streams, assigning a coefficient to the endpoint from which the media stream is received and multiplying the assigned coefficient with the power indicator of the media stream to determine the normalized power indicator. Assigning a coefficient to the endpoint may comprise assigning a coefficient to the endpoint based on a priority level of a conference participant associated with the endpoint or based on a power level of a spoken name of a conference participant associated with the endpoint. Assigning a coefficient to the endpoint from which the media stream is received may also comprise determining a power level of a decoded media stream from the endpoint, comparing the power level of the decoded media stream with the power indicator of the decoded media stream, and assigning a coefficient to the endpoint to account for a difference between the power level and the power indicator of the decoded media stream. The plurality of media streams may each comprise one or more real time protocol (RTP) packets, where the headers of the RTP packets comprise a power field extension carrying the power indicators and the extension is added to the header by setting the X bit of the header to 1.

In accordance with another embodiment, a conference unit system for providing a conference service includes a processor operable to host a conference between a plurality of endpoints and a plurality of communication ports operable to receive from the plurality of endpoints a plurality of media streams. The plurality of media streams each include a power indicator. The system includes a selection module operable to normalize the power indicators to determine a normalized power indicator for each of the plurality of media streams and select, based on the normalized power indicators of the plurality of media streams, a first number of the plurality of media streams for processing into a conference stream. The system also includes digital signal processors operable to process the selected first number of the plurality of media streams into the conference stream. The communication ports are operable to communicate the conference stream to at least some of the plurality of endpoints.

Technical advantages of particular embodiments include methods and systems for providing a conference service that review power indicators of conference input media streams in order to select which streams are processed (e.g., transcoded, decompressed, packetized, etc.) for communication to conference participants. Thus, not all received input streams have to be decompressed to select the particular input streams for processing. Accordingly, the utilization of digital signal processing (DSP) resources in a conference system can be reduced. In addition, power indicators from conference endpoints may be normalized to ensure a fair comparison of the received input streams.

Other technical advantages will be readily apparent to one skilled in the art from the following figures, descriptions and claims. Moreover, while specific advantages have been enumerated above, various embodiments may include all, some or none of the enumerated advantages.

BRIEF DESCRIPTION OF THE DRAWINGS

For a more complete understanding of the present invention and its advantages, reference is now made to the following description, taken in conjunction with the accompanying drawings, in which.

DETAILED DESCRIPTION OF THE INVENTION

Figure 1:
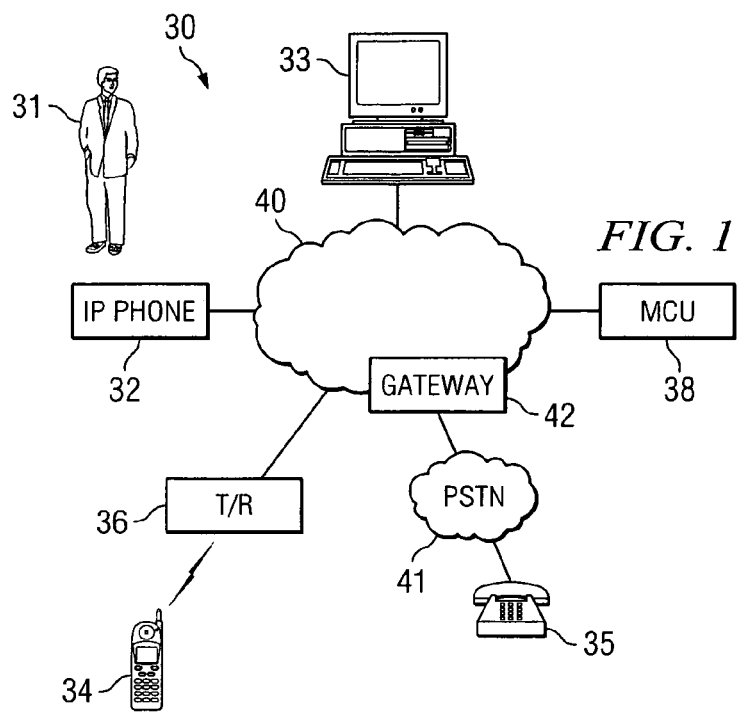
FIG. 1 illustrates a communication system with a plurality of endpoints and a multipoint conference unit, in accordance with a particular embodiment of the present invention.

FIG. 1 illustrates a communication system 30 including a plurality of endpoints 32-35 having the ability to establish communication sessions with each other and/or a multipoint conference unit (MCU) 38. Such communication sessions may be established using communication networks 40, 41 and/or additional endpoints, components or resources coupled with communication networks 40 or 41. MCU 38 hosts, or accommodates, multipoint conferences between and among endpoints 32-35. An MCU or other entity may be considered to be hosting a conference if it is one or more of the components that accommodates or otherwise provides conference resources to facilitate the conference. Participant 31 participates on a conference hosted by MCU 38 using, for example, endpoint 32.

In accordance with particular embodiments, systems and methods are provided that review power indicators of conference input media streams in order to select which streams are processed (e.g., transcoded, decompressed, packetized, etc.) for communication to conference participants. Thus, not all received input streams have to be decompressed to select the particular input streams for processing. Accordingly, the utilization of digital signal processing (DSP) resources in a conference system can be reduced. In addition, power indicators from conference endpoints may be normalized to ensure a fair comparison of the received input streams. Particular embodiments may be especially useful for conference systems with a large number of participants who use non-linear compression algorithms or when the different participants use a variety of different compression algorithms. Computation complexity is pushed to the endpoints. The number of communication ports may be increased without requiring additional transcoding resources in the system. In addition, the system can reduce the impact from echo. When participants do not speak, their microphone input is set at zero signaling to the MCU that the input from their specific port should not be mixed into a conference stream.

Endpoints 32-35 may be any combination of hardware, software and/or encoded logic that provide communication services to a user. For example, endpoints 32-35 may include a telephone, a mobile phone, a computer running telephony software, a video monitor, a camera or any other communication hardware, software and/or encoded logic that supports the communication of media using communication network 40. In the illustrated embodiment, endpoints 32-34 include an internet protocol (IP) phone, a personal computer and wireless handset, respectively. A wireless base station transmitter/receiver 36 couples endpoint 34 with communication network 40. Endpoints 32-35 may also include unattended or automated systems, gateways, other intermediate components or other devices that can establish media sessions. Although FIG. 1 illustrates four endpoints 32-35, communication system 30 contemplates any number and arrangement of endpoints 32-35 for communicating media and participating in a multipoint conference. For example, the described technologies and techniques for establishing a communication session between or among endpoints 32-35 may be operable to establish a multipoint conference between more than two endpoints 32-35.

In the illustrated embodiment, MCU 38 acts as an intermediary during the multipoint communication conference, collects all audio and/or video streams transmitted by the participants through their endpoints and selects one or more of such streams for distribution to the participants of the multipoint conference at their endpoints. Typically, for IP telephony applications, conferences are hosted by a MCU.

MCU 38 may include any bridging or switching device used in support of multipoint conferencing, including videoconferencing. MCU 38 selects input media streams for mixing and conveyance at an output stream to one or more endpoints coupled to the MCU, as further discussed below. In various embodiments, MCU 38 may include hardware, software and/or embedded logic to perform the functionality described herein. MCU 38 may be configured to support any number of conference endpoints communicating on any number of conferences, simultaneously. MCU 38 may be in the form of customer provided equipment (CPE) (for example, beyond the network interface) or may be embedded in a wide area network (WAN). Examples of multipoint conference unit standards are defined in ITU-T H.323, with T.120 describing generic conference control functions.

A user of communication system 30 may configure MCU 38 to accommodate a future multipoint conference. When a user or network administrator schedules or otherwise establishes a multipoint conference, MCU 38 prompts the administrator to identify the number of participants and one or more unique identifiers. The MCU may use, for example, a separate unique identifier for each participant of a conference or a single unique identifier for the entire conference (one for all the conference participants).

Although specific communication networks 40 and 41 are illustrated in FIG. 1, the term "communication network" should be interpreted as generically defining any network capable of transmitting audio and/or video telecommunications signals, data and/or messages. Communication network 40 may be any computer or communication network capable of coupling two or more endpoints 32-35 for communication. In the illustrated embodiment, communication network 40 is a wide area network (WAN) that enables communication between a plurality of endpoints distributed across multiple cities and geographic regions, and communication network 41 is a public switched telephone network (PSTN). However, communication networks 40 and/or 41 may be one or more networks, including the Internet, the public switched telephone network, local area networks (LANs), global distributed networks such as intranets, extranets or other form of wireless or wireline communication networks. Generally, communication networks 40 and 41 provide for the communication of packets, cells, frames and/or other portions of information (generally referred to as packets) between and among endpoints 32-35. Communication paths for the communication of such packets may include any combination of routers, hubs, switches, gateways (e.g., gateway 42) or other hardware, software or embedded logic implementing any number of communication protocols that allow for the exchange of packets in communication system 30.

In a particular embodiment, communication network 40 employs communication protocols that allow for the addressing or identification of endpoints 32-35 coupled to communication network 40. For example, using Internet protocol, each of the components coupled together by communication network 40 in communication system 30 may be identified in information directed using IP addresses. In this manner, communication network 40 may support any form and combination of point-to-point, multicast, unicast or other techniques for exchanging media packets among components in communication system 30.

Any given communication session between two of endpoints 32-35 will include the transfer of packets across one or more communication paths, that couple endpoints 32-35 and/or MCU 38 across communication network 40. Such paths may include any combination of network components, gatekeepers, call managers, routers, hubs, switches, gateways, endpoints or other hardware, software or embedded logic implementing any number of communication protocols that allow for the exchange of packets in communication system 30.

Network 40 may be directly coupled to other IP networks including, but not limited to, the Internet. Since IP networks share a common method of transmitting data, telecommunication signals may be transmitted between telephony devices located on different, but interconnected, IP networks. In addition to being coupled to other IP networks, network 40 may also be coupled to non-IP telecommunication networks through the use of gateway 42. For example, network 40 is coupled to Public Switched Telephone Network (PSTN) 41. PSTN 41 includes switching stations, central offices, mobile telephone switching offices, pager switching offices, remote terminals and other related telecommunications equipment that are located across the country.

IP networks transmit data (including voice and video data) by placing the data in packets and sending each packet individually to the selected destination. Unlike a circuit-switched network (like PSTN 41), dedicated bandwidth is not required for the duration of a call or fax transmission over IP networks. Instead, each telephony device sends packets across the network as they become available for transmission. This feature makes bandwidth available for other data when voice or fax data is not being transmitted.

The technology that allows telecommunications to be transmitted over an IP network may be referred to as Voice over IP (VoIP). In the illustrated embodiment, endpoints 32-34 and MCU 38 are IP telephony devices. IP telephony devices have the capability of encapsulating a user's voice (or other inputs) into IP packets so that the voice can be transmitted over network 40. Similarly, IP telephony devices 32-34 have the capability of capturing and encapsulating video into IP packets so that the video can be transmitted over network 40. Conversely, IP telephony devices 32-34 have the capability of receiving audio or video IP packets from the network 40 and playing the audio or video data to a user.

Gateway 42 may accomplish several functions, such as converting analog or digital circuit-switched data transmitted by PSTN 41 to packetized data transmitted by network 40 and vice-versa. When voice data packets are transmitted from network 40, gateway 42 retrieves the data contained in the incoming packets and converts this digital data to the analog or digital format used by the PSTN trunk to which gateway 42 is coupled. Since the digital format for voice transmissions over an IP network is often different than the format used on the digital trunks of PSTN 41, the gateway provides conversion between these different digital formats, which is referred to as transcoding. Gateway 42 also translates between the VoIP call control system and other signaling protocols (e.g., SS7, T1, ISDN, etc.) used in PSTN 41 and translates and/or maps between the IP network addresses and PSTN phone numbers.

For voice transmissions from PSTN 41 to network 40, the process is reversed. In a particular embodiment, gateway 42 takes the incoming voice transmission (in either analog or digital form) and converts it into the digital format used by network 40. The digital data is then encapsulated into IP packets and transmitted over network 40.

Figure 2:
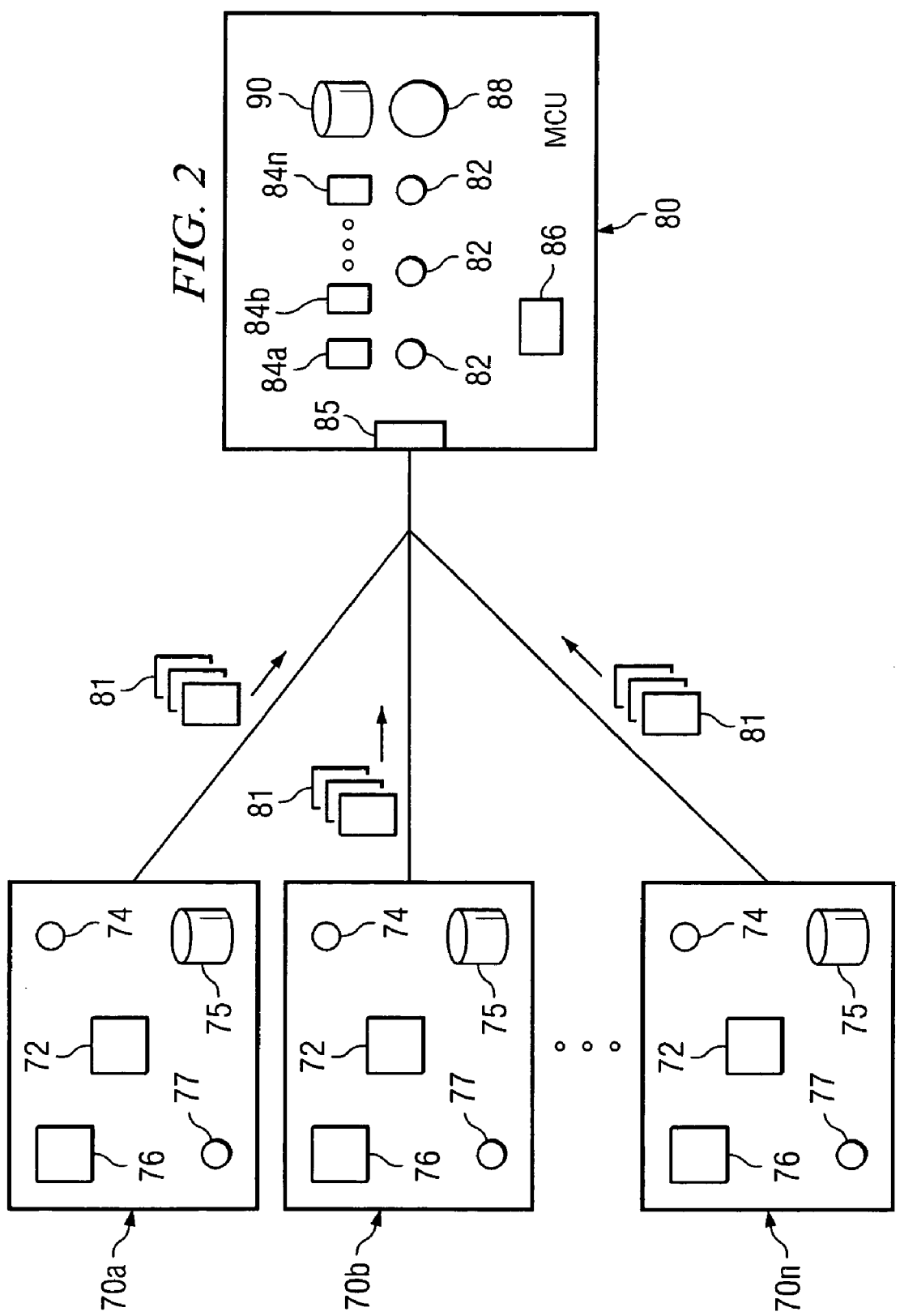
FIG. 2 illustrates a multipoint conference unit and a plurality of endpoints, in accordance with a particular embodiment of the present invention.

FIG. 2 illustrates a plurality of endpoints 70a-70n coupled to an MCU 80, in accordance with a particular embodiment. MCU 80 provides conference functionality between participants using endpoints 70a-70n. Endpoints 70a-70n may be similar to one or more of the endpoints described above with respect to FIG. 1, such as IP phone endpoint 32. It should be understood that endpoints 70a-70n may be coupled to MCU 80 through one or more communication networks, such as communication networks 40 and 41 described above with respect to FIG. 1 which may include one or more WANs or LANs as indicated above.

In the illustrated embodiment, endpoints 70a-70n each include a power module 72, a digital signal processor (DSP) 74, memory 75, user interface 76 and a processor 77. Power module 72 assigns a power indicator to communication streams transmitted from the endpoint to MCU 80. This power indicator is used by MCU 80 in the selection of media streams for communication to conference participants, as further discussed below. Power module 72 may comprise any suitable combination of hardware, software and/or embedded logic.

DSP 74 includes a codec (coder/decoder) that converts voice, video or fax signals generated by the users of the telephony devices from analog media signals into digital form. The codec may be implemented either in software or as special-purpose hardware in the endpoints. In the case of an IP phone, as the user speaks, the codec converts the analog voice signals into digital data. The digitally encoded data is then encapsulated into IP packets so that it can be transmitted over the communication network. Conversely, a codec at the receiving endpoint converts the digital data into analog media for the users of the telephony devices. In the case of an IP phone, digital data from IP encapsulated packets are received from the MCU through a communication network. The codec at the receiving endpoint converts the digital voice, video or fax data received from the MCU into analog media to be played to the users of the telephony devices. Packets 81 are illustrated as communicating media from endpoints 70a-70n to MCU 80 for a conference. Packets 81 may include a power level indicator to inform MCU 80 of the power level of their respective media so that MCU 80 may select the appropriate packets for decoding and mixing, as further discussed below.

Memory 75 may include any form of volatile or nonvolatile memory including, without limitation, magnetic media, optical media, random access memory (RAM), read only memory (ROM), removable media or any other suitable local or remote memory component. Processor 77 may comprise one or more microprocessors, controllers or any other suitable computing devices or resources.

User interface 76 may include a microphone, video camera, speaker, keyboard, video display, LCD display and/or other device. In some embodiments, and endpoint's user interface 76 may be coupled with components that include a microphone, video camera, speaker, keyboard, video display and/or other device, rather than incorporating such components into the endpoint.

In the illustrated embodiment, MCU 80 includes a plurality of digital signal processors (DSPs) 82, a plurality of communication ports 84a-84n, a network interface 85, a selection module 86, a processor 88 and memory 90.

DSPs 82 include codecs that decode received media streams so that they may be bridged together to form a mixed stream that is coded by the DSPs for transmission to conference participants. In some cases, this transcoding may include conversion to and from different compression algorithms (e.g., G.711, G.723, G.728). The terms "digital signal processors" or "DSPs" as used herein shall refer to one or more digital signal processors or one or more other components providing the signaling processing functionality described herein. In particular embodiments, MCU 80 may include software functioning as a DSP on a general purpose central processing unit, such as processor 88.

In particular embodiments, endpoints whose input streams are selected for processing may receive from an MCU a mixed stream that does not include their particular input to the conference. As a result, input streams selected for processing and mixing may be mixed into multiple mixed streams for transmission to conference participants. For example, if input streams from three speakers A, B and C are selected for processing and mixing, then speaker A may receive a mixed stream that includes the input from speakers B and C (but not the input from speaker A), speaker B may receive a mixed stream that includes the input from speakers A and C (but not the input from speaker B), speaker C may receive a mixed stream that includes the input from speakers A and B (but not the input from speaker C), and the remaining conference participants may receive a mixed stream that includes the mixed input from speakers A, B and C.

Selection module 86 reviews and analyzes power indicators of input streams received from endpoints 70a-70n to select particular streams for decoding and bridging together for transmission to conference participants, as further discussed below. Selection module 86 may comprise any suitable combination of hardware, software and/or embedded logic.

Processor 88 may be a microprocessor, controller or any other suitable computing device or resource. Memory 90 may be any form of volatile or nonvolatile memory including, without limitation, magnetic media, optical media, random access memory (RAM), read only memory (ROM), removable media or any other suitable local or remote memory component.

In particular embodiments, endpoints 70a-70n participating on a multipoint conference call measure the power level in the analog signal input media stream received from the conference participant using power module 72 before encoding, packetizing and sending the input stream to MCU 80. In some embodiments, the power level information may be transmitted to MCU 80 by extending the RTP header, such as by setting the "X" bit in the RTP header. As an example, the header may be extended by a single 32-bit word field named "power." For example, the X bit in the first octet of the RTP packet is set to 1 so that an extension packet such as the following would be added to the RTP packet.

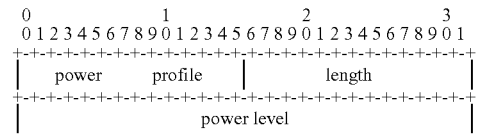

The power profile may be a 16 bit number that identified this header as a power header. The length may contain the number of octets in the power level, so, for example, 4. The power level may contain an integer, fixed point or floating point number indicating the power level. For example, it could be 32 bit integer which represented the power level in dBm.

MCU 80 receives each input media stream and compares the entries in the power fields of the media streams. MCU then selects a certain number of streams having the highest power field entries for decoding, possible conversion to a particular compression algorithm and bridging to the conference participants. Particular embodiments may select any number of media streams for mixing, based on the total number of conference participants or other operational needs. In some cases, three input streams having the highest power field entries may be selected.

As an example during operation, a multipoint conference may include 50 participants each participating in the conference on a respective endpoint. Any number of participants may be speaking at one time. Each respective endpoint of one of the 50 participants transmits to a hosting MCU packetized streams of media from its associated participant along with a power level indicating the power of the media transmitted to the MCU. Then MCU may review the power level indicators of the received media streams and select a certain number of the media streams having the highest power level indicators for mixing to transmit to the conference participants. As a result, the MCU needs to decompress, decode and/or convert only the media streams selected for mixing and does not have to perform such processing on all media streams received. In some cases, the selected media streams may be converted to a G.711 protocol. Accordingly, the amount of DSP resources needed to process and mix media streams is reduced.

In some embodiments, MCU 80 may normalize the input stream information from the endpoints to accommodate for systematically incorrect power values relative to values received from other endpoints. In some embodiments, each media stream may have a coefficient associated with its power field value. While the power indicator is assigned by the particular endpoint from which the associated media stream is received, the coefficient for media streams from a particular participant/endpoint may be assigned by either the endpoint or the MCU. Initially all coefficients may be set to 1 such that the input streams can be compared on a 1 to 1 basis according to power field value when MCU is selecting one or more input streams for decoding, mixing and transmission to conference participants. As MCU 80 chooses a media and transcodes it to, for example, G.711 protocol, it compares the power in the transcoded G.711 signal with the information in the power field. If, for example, the measured power in the n th media stream is 5.5 mw and the reported power, according to the power indicator associated with the media stream, is 5 mw, the MCU may update the n th coefficient to be 5.5/5=1.1. To normalize the reported power from all media streams, the system may compare the weighted power (n)=reported power (n)*Coefficient (n) and assign the top speaker role to the particular number of media streams (e.g., three) with the highest weighted power. Normalizing the power field values across different input streams can ensure a fair comparison between the different signals.

For example, this may correct a situation where a malicious conference participant attempts to manipulate the system to dominate the conference and preempt other participants by altering the power field assignment of his endpoint to ensure selection of his media stream. In addition, normalizing power field values can increase fairness when endpoints of various manufacturers may not comply with a particular standard.

In some embodiments, an MCU may sample input streams from various endpoints for decoding, determining the real power level of the streams and comparing the determined power level to the endpoint's weighted power using the endpoint's coefficient and transmitted power indicator. Such sampling may be performed, for example, on a round robin basis or using another sampling method. This enables the MCU to monitor the accuracy of transmitted power indicators while avoiding the need to process each received input stream to ensure power indicators are accurate. If, after comparing the real power level to the weighted power level, it is determined that the coefficient is incorrect, the endpoint's coefficient may be adjusted as appropriate.

In particular embodiments, a coefficient for each input stream coming from a particular endpoint may be calculated based on the power in the "spoken name" of the participant and the associated reported power in the power field. As an example, when a conference participant joins a conference, he may be prompted by the MCU to speak his name. This spoken name may be used by a conference administrator to keep a record of all who joined the conference. Upon receiving the spoken name in a media stream along with a power indicator for the spoken name media assigned by the participant's endpoint, the MCU may decode the spoken name media and compare its actual power level to the power indicator assigned to the media. If, for example, the power indicator is too high relative to the actual power (for example, as a result of manipulation of the endpoint power assignment function or as a result of endpoints that do not meet a particular standard), then the MCU may assign a coefficient to the endpoint that will result in a reduction in the power indicator received from the endpoint in future media streams to ensure a fair comparison with media streams received from other endpoints. If, however, the power indicator is too low relative to the actual power level of the spoken name, a coefficient may be assigned by the MCU so that the power indicator associated with future media streams from that endpoint will be increased for fair comparison with conference media received from other participant endpoints. Thus, by using participants' spoken names to compare power indicators, normalization may be performed automatically without requiring intervention from users or a system administrator.

In some embodiments, this normalization process may be used to set priorities for particular users. For example, a conference moderator may receive a coefficient factor of 1.5 while other participants receive a coefficient factor of 1. Thus, even when talking at the same raw power level, the moderator's weighted power will be higher than that of the other participants ensuring the moderator priority in the MCU's selection process. Thus, the moderator may not have to raise his voice to overcome a loud participant in order for his input to be selected for mixing and transmission to the participants. Key participants (e.g., higher level participants such as officers in an organization) may also have priority. As an example, a conference moderator may have a coefficient factor of 1.5, while key participants have a coefficient factor of 1 and other participants have a coefficient factor of 0.9. The assignment of coefficient factors to various participants to aid in the input media selection process may be based on any suitable operational desires.

Figure 3:
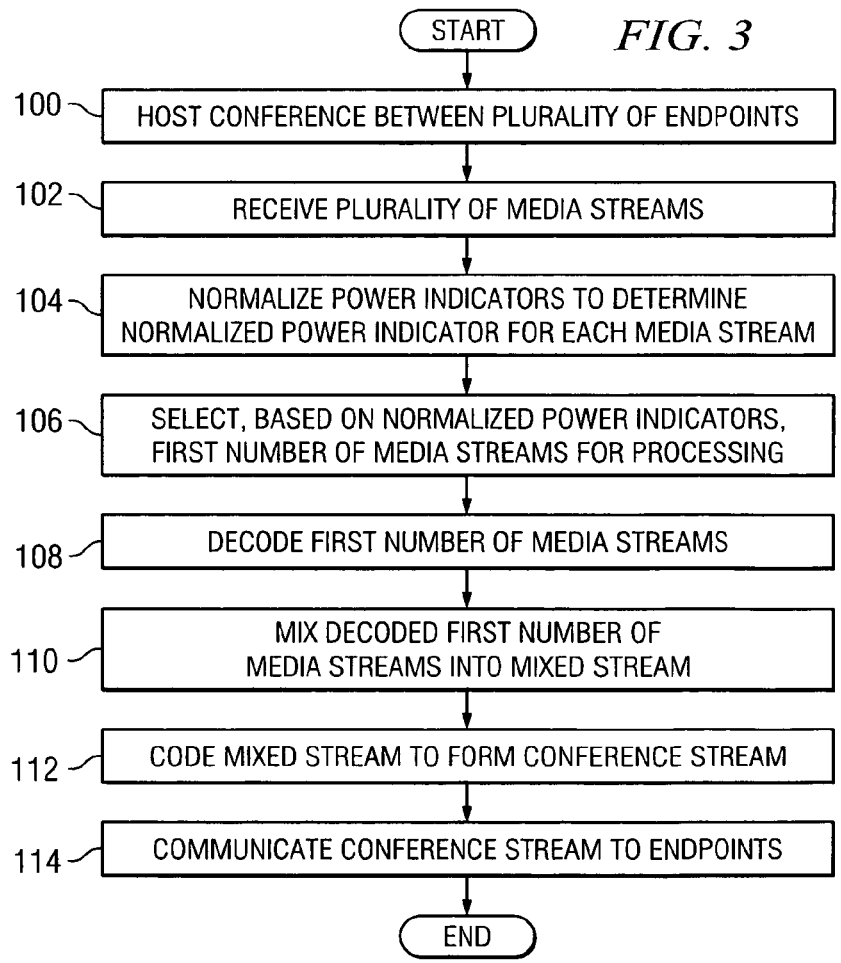
FIG. 3 illustrates a method for providing a conference service using speaker selection, in accordance with an embodiment of the present invention.

FIG. 3 is a flowchart illustrating a method for providing a conference service using speaker selection, in accordance with a particular embodiment. The method begins at step 100 where a conference is hosted between a plurality of endpoints. The conference may be hosted by a multipoint conference unit. The endpoints may include, for example, IP phones or other devices communicating with the multipoint conference unit through IP technology. Each endpoint may be used by one or more conference participants to participate on the conference. At step 102, a plurality of media streams are received at the multipoint conference unit from the plurality of endpoints. Each media stream may include a power indicator that indicates a power level of the communications included in the media stream. In some embodiments, the power indicator may be included in a power field extension of an RTP packet header.

At step 104, the power indicators are normalized to determine a normalized power indicator for each media stream. Normalization of a media stream may be accomplished by assigning a coefficient to the endpoint from which the media stream is received and multiplying the assigned coefficient with the power indicator of the media stream to determine a weighted power, or the normalized power indicator. The coefficient may be assigned based on a priority level of a conference participant (e.g., a conference moderator, key participant, officer, lower level employee, etc.) associated with the endpoint. In some embodiments, the coefficient may be assigned based on a power level of a name of a conference participant spoken when the participant joins the conference. In addition, a coefficient may be assigned or changed based on a power level of media from the endpoint that has previously been received, decoded and compared with the power indicator from the endpoint.

At step 106, a first number of the media streams received at step 102 are selected for processing. Such selection may be based on the normalized power indicators. For example, if 50 media streams are received, the 3 media streams having the highest normalized power indicators may be selected for processing. The processing may include, for example, decoding, mixing and coding or other processing algorithms or techniques. In the illustrated flowchart, at step 108 the selected first number of media streams are decoded, at step 110 the decoded first number of media streams are mixed into a mixed stream, and at step 112 the mixed stream is coded to form a conference stream. The coding of the mixed stream may include converting the mixed stream to a G.711 protocol. As discussed above, in particular embodiments endpoints whose input streams are selected for processing may receive from the MCU a mixed stream that does not include their particular input to the conference. As a result, input streams selected for processing and mixing may be mixed into multiple mixed streams for transmission to conference participants. Thus, the illustrated method may include mixing some of the media streams into additional mixed streams that do not include the input received from endpoints to which the additional mixed streams will be communicated.

At step 114, the conference stream is communicated to endpoints of the conference. It should be understood that in particular cases the conference stream may not be communicated to all endpoints of the conference, as an endpoint used by a participant whose media was selected for inclusion in the conference stream may not receive a conference stream that includes the participant's media.

Some of the steps illustrated in FIG. 3 may be combined, modified or deleted where appropriate, and additional steps may also be added to the flowchart. Additionally, steps may be performed in any suitable order without departing from the scope of the invention.

Although the present invention has been described in detail with reference to particular embodiments, it should be understood that various other changes, substitutions, and alterations may be made hereto without departing from the spirit and scope of the present invention. For example, although the present invention has been described with reference to a number of elements included within communication system 30, MCUs 38 and 80, and various endpoints, these elements may be combined, rearranged or positioned in order to accommodate particular routing architectures or needs. In addition, any of these elements may be provided as separate external components to communication system 30, MCUs 38 and 80 and/or the endpoints where appropriate. The present invention contemplates great flexibility in the arrangement of these elements as well as their internal components.

Numerous other changes, substitutions, variations, alterations and modifications may be ascertained by those skilled in the art and it is intended that the present invention encompass all such changes, substitutions, variations, alterations and modifications as falling within the spirit and scope of the appended claims. Moreover, the present invention is not intended to be limited in any way by any statement in the specification that is not otherwise reflected in the claims.

What is claimed is:

1. A computer-implemented method for providing a conference service executable on a processor, comprising:
   hosting a conference between a plurality of endpoints;
   receiving from the plurality of endpoints a plurality of media streams, the plurality of media streams each including a power indicator;
   normalizing the power indicators to determine a normalized power indicator for each of the plurality of media streams;
   selecting, based on the normalized power indicators of the plurality of media streams, a first number of the plurality of media streams for processing into a conference stream;
   processing the selected first number of the plurality of media streams into the conference stream; and
   communicating the conference stream to at least some of the plurality of endpoints.

2. The method of claim 1, wherein processing the selected first number of the plurality of media streams into the conference stream comprises:
   decoding the first number of the plurality of media streams;
   mixing the decoded first number of the plurality of media streams into a mixed stream; and
   coding the mixed stream to form the conference stream.

3. The method of claim 2, wherein coding the mixed stream to form the conference stream comprises converting the mixed stream to a G.711 protocol.

4. The method of claim 1, wherein normalizing the power indicators to determine a normalized power indicator for each of the plurality of media streams comprises, for each of the plurality of media streams:
   assigning a coefficient to the endpoint from which the media stream is received; and
   multiplying the assigned coefficient with the power indicator of the media stream to determine the normalized power indicator.

5. The method of claim 4, wherein assigning a coefficient to the endpoint comprises assigning a coefficient to the endpoint based on a priority level of a conference participant associated with the endpoint.

6. The method of claim 4, wherein assigning a coefficient to the endpoint comprises assigning a coefficient to the endpoint based on a power level of a spoken name of a conference participant associated with the endpoint.

7. The method of claim 4, wherein assigning a coefficient to the endpoint from which the media stream is received comprises:
   determining a power level of a decoded media stream from the endpoint;
   comparing the power level of the decoded media stream with the power indicator of the decoded media stream; and
   assigning a coefficient to the endpoint to account for a difference between the power level and the power indicator of the decoded media stream.

8. The method of claim 1, wherein the plurality of media streams each comprise one or more real time protocol (RTP) packets, the headers of the RTP packets comprising a power field extension carrying the power indicators, wherein the extension is added to the header by setting the X bit of the header to 1.

9. A conference unit system for providing a conference service, comprising:
   a processor operable to host a conference between a plurality of endpoints;
   a plurality of communication ports operable to receive from the plurality of endpoints a plurality of media streams, the plurality of media streams each including a power indicator;
   a selection module operable to:
      normalize the power indicators to determine a normalized power indicator for each of the plurality of media streams; and
      select, based on the normalized power indicators of the plurality of media streams, a first number of the plurality of media streams for processing into a conference stream;
   digital signal processors operable to process the selected first number of the plurality of media streams into the conference stream; and
   the communication ports operable to communicate the conference stream to at least some of the plurality of endpoints.

10. The system of claim 9, wherein digital signal processors operable to process the selected first number of the plurality of media streams into the conference stream comprises digital signal processors operable to:
    decode the first number of the plurality of media streams;
    mix the decoded first number of the plurality of media streams into a mixed stream; and
    code the mixed stream to form the conference stream.

11. The system of claim 10, wherein digital signal processors operable to code the mixed stream to form the conference stream comprises digital signal processors operable to convert the mixed stream to a G.711 protocol.

12. The system of claim 9, wherein a selection module operable to normalize the power indicators to determine a normalized power indicator for each of the plurality of media streams comprises a selection module operable to, for each of the plurality of media streams:
    assign a coefficient to the endpoint from which the media stream is received; and multiply the assigned coefficient with the power indicator of the media stream to determine the normalized power indicator.

13. The system of claim 12, wherein a selection module operable to assign a coefficient to the endpoint comprises a selection module operable to assign a coefficient to the endpoint based on a priority level of a conference participant associated with the endpoint.

14. The system of claim 12, wherein a selection module operable to assign a coefficient to the endpoint comprises a selection module operable to assign a coefficient to the endpoint based on a power level of a spoken name of a conference participant associated with the endpoint.

15. The system of claim 12, wherein a selection module operable to assign a coefficient to the endpoint from which the media stream is received comprises a selection module operable to:
   determine a power level of a decoded media stream from the endpoint;
   compare the power level of the decoded media stream with the power indicator of the decoded media stream; and
   assign a coefficient to the endpoint to account for a difference between the power level and the power indicator of the decoded media stream.

16. The system of claim 9, wherein the plurality of media streams each comprise one or more real time protocol (RTP) packets, the headers of the RTP packets comprising a power field extension carrying the power indicators, wherein the extension is added to the header by setting the X bit of the header to 1.

17. A system for providing a conference service, comprising:
   means for hosting a conference between a plurality of endpoints;
   means for receiving from the plurality of endpoints a plurality of media streams, the plurality of media streams each including a power indicator;
   means for normalizing the power indicators to determine a normalized power indicator for each of the plurality of media streams;
   means for selecting, based on the normalized power indicators of the plurality of media streams, a first number of the plurality of media streams for processing into a conference stream;
   means for processing the selected first number of the plurality of media streams into the conference stream; and
   means for communicating the conference stream to at least some of the plurality of endpoints.

18. The system of claim 17, wherein means for normalizing the power indicators to determine a normalized power indicator for each of the plurality of media streams comprises, for each of the plurality of media streams:
   means for assigning a coefficient to the endpoint from which the media stream is received; and
   means for multiplying the assigned coefficient with the power indicator of the media stream to determine the normalized power indicator.

19. The system of claim 18, wherein means for assigning a coefficient to the endpoint comprises means for assigning a coefficient to the endpoint based on a priority level of a conference participant associated with the endpoint.

20. The system of claim 18, wherein means for assigning a coefficient to the endpoint comprises means for assigning a coefficient to the endpoint based on a power level of a spoken name of a conference participant associated with the endpoint.

21. The system of claim 18, wherein means for assigning a coefficient to the endpoint from which the media stream is received comprises:
   means for determining a power level of a decoded media stream from the endpoint;
   means for comparing the power level of the decoded media stream with the power indicator of the decoded media stream; and
   means for assigning a coefficient to the endpoint to account for a difference between the power level and the power indicator of the decoded media stream.

22. Software embodied in a computer readable medium, the computer readable medium comprising code that, when executed by a processor, is operable to:
   host a conference between a plurality of endpoints;
   receive from the plurality of endpoints a plurality of media streams, the plurality of media streams each including a power indicator;
   normalize the power indicators to determine a normalized power indicator for each of the plurality of media streams;
   select, based on the normalized power indicators of the plurality of media streams, a first number of the plurality of media streams for processing into a conference stream;
   process the selected first number of the plurality of media streams into the conference stream; and
   communicate the conference stream to at least some of the plurality of endpoints.

23. A system for providing a conference service, comprising:
   a plurality of endpoints each associated with a conference participant, the plurality of endpoints each operable to:
      receive conference input from its associated conference participant;
      code the conference input for communication in a media stream to a conference system coupled to the plurality of endpoints; and
      assign, for communication in the media stream, a power indicator to the conference input based on a power level of the conference input; and
   the conference system comprising:
      a processor operable to host a conference between the plurality of endpoints;
      a plurality of communication ports operable to receive from the plurality of endpoints a plurality of media streams;
      a selection module operable to:
         normalize the power indicators to determine a normalized power indicator for each of the plurality of media streams; and
         select, based on the normalized power indicators of the plurality of media streams, a first number of the plurality of media streams for processing into a conference stream;
      digital signal processors operable to process the selected first number of the plurality of media streams into the conference stream; and
      the communication ports operable to communicate the conference stream to at least some of the plurality of endpoints.

* * * * *